United States Patent [19]

Marshall et al.

[11] Patent Number: 5,076,134
[45] Date of Patent: Dec. 31, 1991

[54] LAUNCH CONTAINER FOR MULTIPLE STORES USING PIEZO ELECTRICALLY-ACTUATED PADDLE ASSEMBLIES

[75] Inventors: Frank P. Marshall, Penns Park; Bruce W. Travor, Holland; Timothy L. Kraynak, Hatboro, all of Pa.

[73] Assignee: The United States of America as represented by the Secretary of the Navy

[21] Appl. No.: 605,905

[22] Filed: Oct. 30, 1990

[51] Int. Cl.⁵ ............................................. B64D 1/04
[52] U.S. Cl. .................................. 89/1.51; 244/137.4
[58] Field of Search .......................... 244/137.1, 137.4; 89/1.59, 1.57, 1.51

[56] References Cited

U.S. PATENT DOCUMENTS

| | | | |
|---|---|---|---|
| 3,240,200 | 3/1966 | Jones | 89/1.51 |
| 4,026,188 | 5/1977 | Woodruff et al. | 89/1.51 |
| 4,164,887 | 8/1979 | Ouellette | 89/1.51 |
| 4,263,835 | 4/1981 | Dragonuk | 89/1.51 |
| 4,397,433 | 8/1983 | Guitaut et al. | 244/137.4 |
| 4,444,085 | 4/1984 | Dragonuk | 89/1.51 |
| 4,474,101 | 10/1984 | Boulard et al. | 89/1.51 |
| 4,930,398 | 6/1990 | Sharples | 89/1.51 |
| 4,962,798 | 10/1990 | Ferraro et al. | 244/137.1 |

Primary Examiner—David H. Brown
Attorney, Agent, or Firm—James V. Tura; James B. Bechtel; Susan E. Verona

[57] ABSTRACT

A multi-store launcher has each store in a stacked sequence releasably held by a swinging paddle assembly against the ejection force of negator springs. Each paddle assembly carries a burn resistor that is wired to maintain the paddles in a locked position. A pneumatic pulse from the transporting vehicle causes electronic circuitry to make the resistor fail, freeing the paddles to open away from the store and thereby allowing it to be ejected by the negator springs.

7 Claims, 3 Drawing Sheets

LAUNCH CONTAINER FOR MULTIPLE STORES USING PIEZO ELECTRICALLY-ACTUATED PADDLE ASSEMBLIES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention discloses an electronically-actuated, multi-store dispenser wherein spring forces pushing against multiple burn-resistor paddle assemblies cause sequential launching of stores from their tandem position inside a launch container. In some environments, it is desirable to dispense multiple stores from a launch vehicle, for instance sonobuoys, in dense patterns. Due to physical limitations of space in the dispensing vehicle, an effort was made to miniaturize the active components inside the store and therefore reduce the overall outer dimensions thereof. Once the size of the store was reduced, in order to meet the demands of the denser patterns, the inside of the individual launch containers were modified to allow each to hold and dispense more than one store. This new type of launch container, in addition to maintaining the size requirement dictated by the transporting vehicle, is operated by the vehicle's pneumatic systems.

SUMMARY OF THE INVENTION

It is therefore an object of the present invention to provide from a standard-size launch container a multi-store launcher for launching, sequentially, a plurality of stores wherein said launcher is adaptable to presently existing transporting vehicles.

It is another object of the present invention to provide a multi-store launcher that is able to use pneumatic pulses from the transporting vehicle to sequentially activate a piezo-electric component that enables paddle assembly means carried adjacent each store to release said store.

It is still another object of the present invention to provide said multi-store launcher, which uses said paddle, without making significant alterations to the standard-size launch container.

These and other objects and many attendant advantages of the present invention are achieved by providing a standard size, tubular, launch container with a piezo-electronic circuit and a plurality of sequentially stacked stores, each removeably held against negator springs by paddle means. The container is connected into standard ports of a transporting aircraft and pneumatic pulses sent to the piezo-electronic circuit. The stores are sequentially packed into the top of the container with a pair of negator springs biasing thereagainst. Each paddle assembly consists of a pair of paddles locked by a burn resistor. Upon an electrical pulse being received from the piezo-electronic circuitry, the burn resistor of the lowermost store assembly fails and frees the paddle assembly and the two paddle arms are forced out of the pathway of the store. Force from the negator springs ejects the store through the discharge end.

BRIEF DESCRIPTION OF THE DRAWINGS

FIG. 3 shows a cross-sectional view of the discharge end of the launch container taken at lines III—III of FIG. 2;

FIG. 4 shows a cross-sectional view of a paddle assembly release means taken along lines IV—IV of FIG. 3;

FIG. 6 shows a schematic diagram of the electronic circuitry used to discharge stores from the launch container.

DETAILED DESCRIPTION OF THE PREFERRED EMBODIMENT

Figure 1:
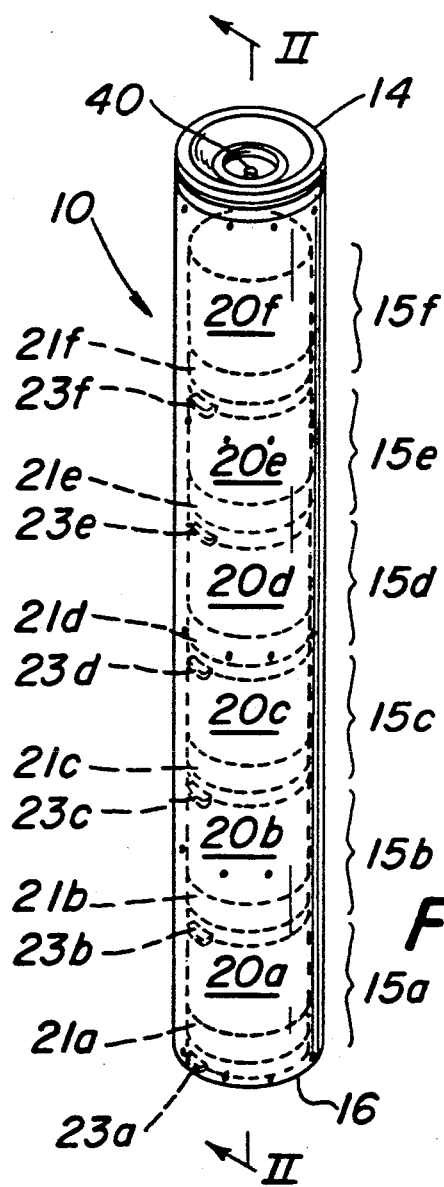
FIG. 1 shows a longitudinal view of a launch container with portions in phantom to show a plurality of stores inside of the launch container.

Referring now to the drawings, wherein like reference characters designate like or corresponding parts throughout the several views, a longitudinal sideview, with partial cross-section, of the instant invention is seen in FIG. 1. A standard tubular launch container 10, that connects with a transporting aircraft (not shown) has a piezo-electric disc 40 at the breech end 14 to receive pneumatic pulses from the aircraft (not shown) in the normal manner. Store assemblies 15a, b, c, d, e and f, are packed inside container 10 (as will be described) for sequential discharge through the discharge end 16 of launcher 10. Launcher 10 can be made from any lightweight, but rigid, material such as ABS plastic or aluminum, and has at its breech end a circular lug 18 therearound to matingly attach to ports in the aircraft.

Figure 2:
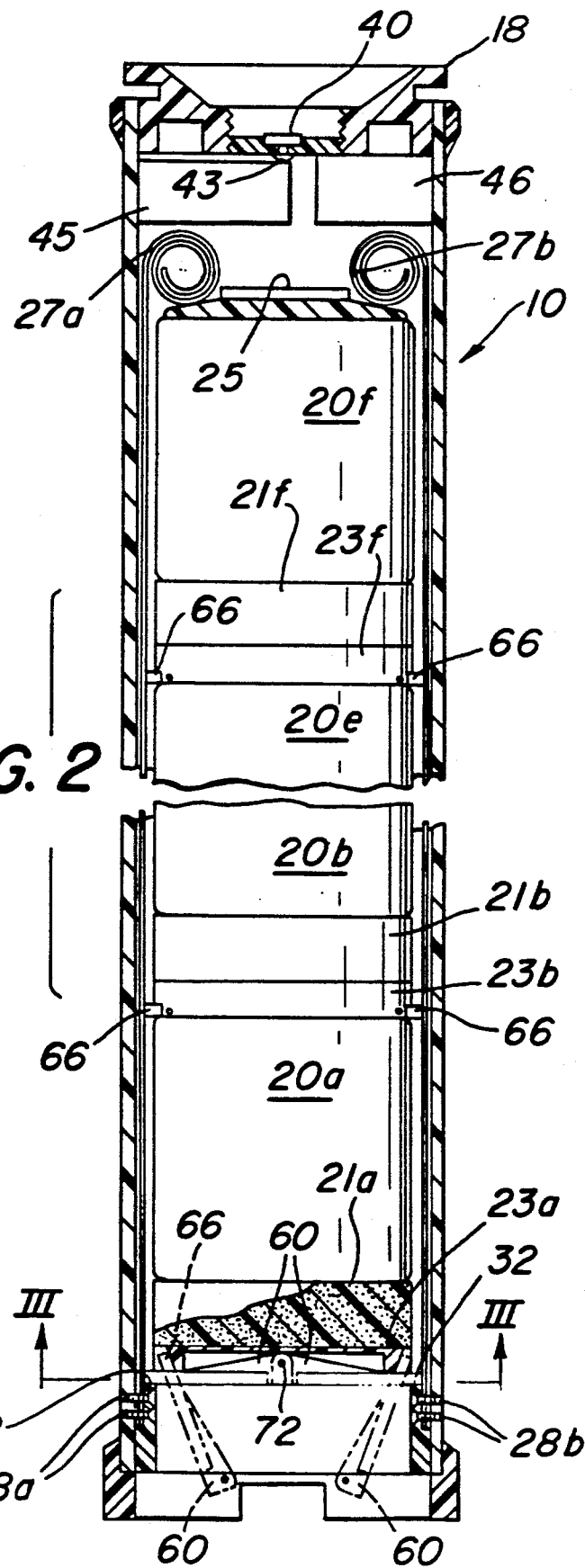
FIG. 2 shows an enlarged cross-sectional view of the launch container taken along lines II—II of FIG. 1.
Figures 3, 4, 6:
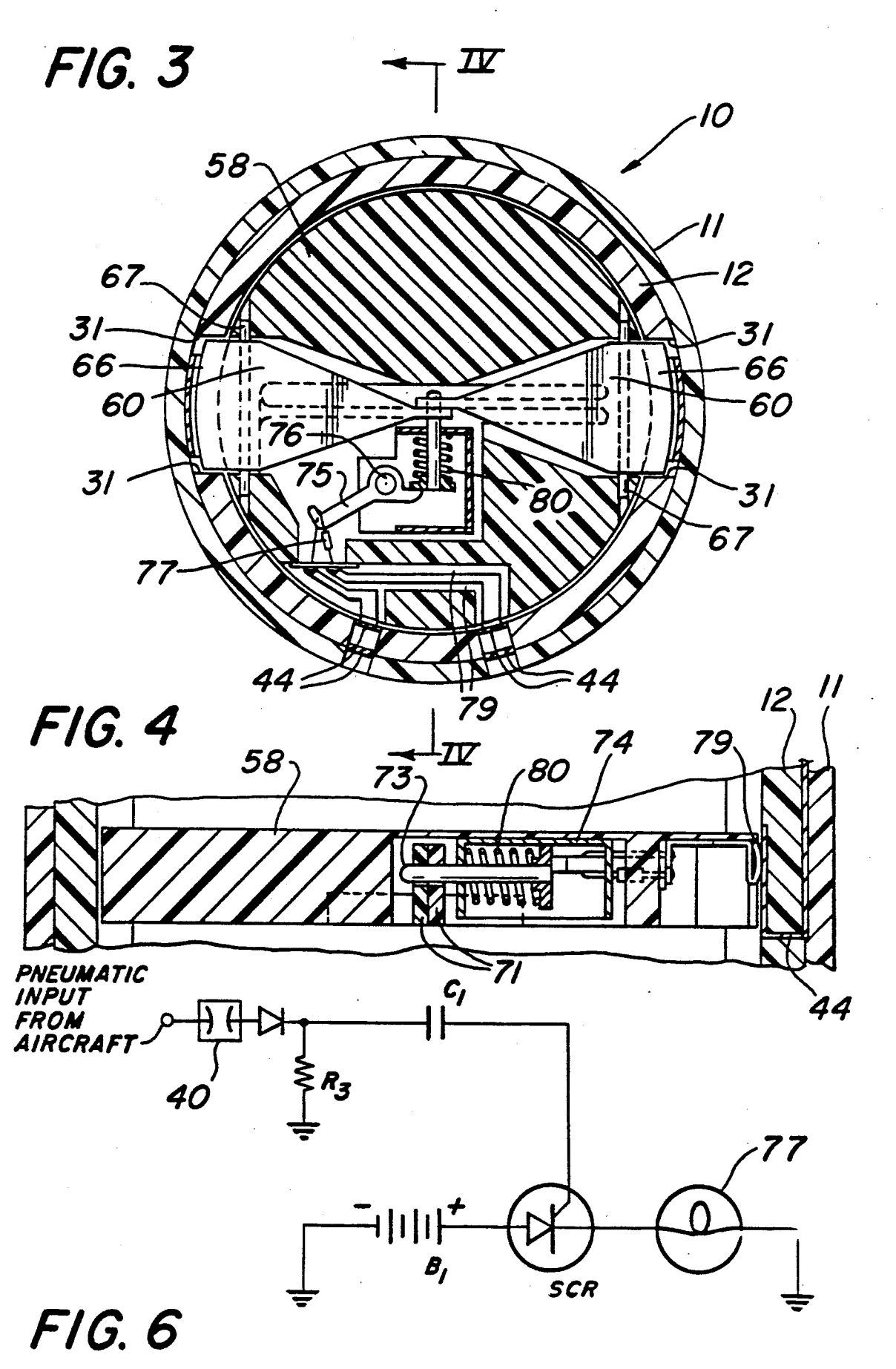
Figure 5:
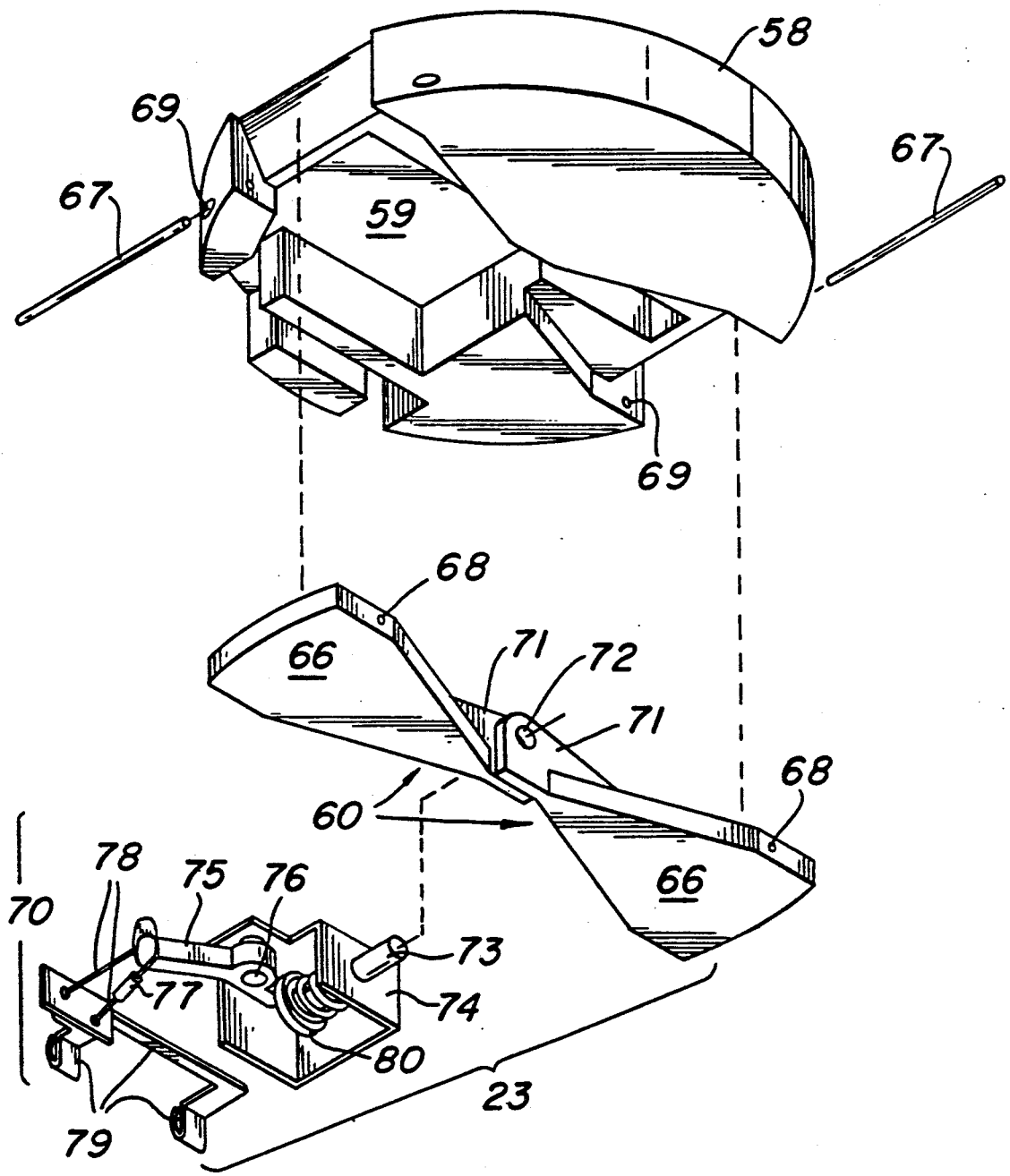
FIG. 5 shows an exploded view of a paddle assembly.

FIG. 2 shows a cross-sectional view of launcher 10 taken along lines II—II of FIG. 1 and shows that each store assembly 15a–f is comprised of a store 20, a shock absorber 21 and a release means, such as a paddle assembly 23 (see in cross-section in FIGS. 3 and 4 and in an exploded perspective view in FIG. 5). As can be seen, the store assemblies, which can include sonobuoys, are packed into launcher 10 in the following order: a store 20 first, then a shock absorber 21 (such as a cellular foam disk), and then a paddle assembly 23. Atop of the first store 20f to be pushed into container 10 is placed a plastic disk 25 that acts to control movement of a pair of negator springs 27a,b that extend, longitudinally, along the inside periphery of container 10. Springs 27a,b are anchored, as by screws 28a,b, into the lower portion of launcher 10 and are uncurled as more store assemblies are pushed inside launcher 10. When the packing is complete, springs 27a,b exert sufficient force on the stack of store assemblies to forcefully, within predetermined parameters, eject each store assembly 15a–f out of the discharge end 16.

Turning now to FIGS. 3, 4 and 5, the release means, or paddle assemblies 23, used to contain each store assembly 15 inside container 10 will be described. As can be seen in FIG. 3, launcher 10 is composed of an outer layer 11 and a concentrically adjacent inner layer 12. Oppositely-disposed channels 31 are cut longitudinally into inner layer 12 wide enough to allow sliding accommodation of the ends 66 of paddles 60 from near the breech end 14 until a pair of stops 32. Electrical leads, such as copper strips 44, run from electronics circuitry 45 longitudinally to the discharge end 16 along the outer-most surface of inner layer 12 and can be attached by convenient fastening means, such as rivets.

FIG. 5 shows that each assembly 23 is comprised of a plastic base disk 58, with appropriately-sized recessed areas 59 to hold paddles 60, two essentially triangularly-shaped paddles 60 oriented apex to apex and rotatingly held near their ends 66 by pins 67, and a release device 70. Base disk 58 is made with sufficient thickness to allow paddles 60, when in lateral alignment, to fit into recessed areas 59 with little or no protruding parts. As can be seen, pins 67 are inserted through apertures 69 in disk 58 and through apertures 68 in paddle ends 66, thus allowing the tabs 71 at each apex to be in side-by-side adjacent position to align bore 72. Pin 73 of release device 70 releasingly fits into bore 72 thereby maintaining paddles 60 in a locked position, until an electrical pulse is received, as will be described.

Release device 70 is comprised of a device housing 74 in the form of a box with two adjacent and open sides. A lever 75 is pivotally attached, as at pin 76, to oscillate from a closed position to an open position. A burn resistor 77, as is known, connected by wire leads 78 to plate leads 79 provides sufficient strength to hold one end of lever 75 against the expansion strength placed against the other end by spring 80. Housing 74, with spring 80 and plate leads 79 within appropriately-sized recesses in, and is attached to disk 58, as is known.

FIG. 2 shows that piezo-electric disk 40 is mounted at the breech end 14 to place an electric lead 43 therefrom into contact with control electronics 45. FIG. 6 shows a schematic diagram of the electronic components connected, as is known, on a modular circuit board.

Operation

When it is time to deliver store 20a, a pneumatic pulse is sent from the aircraft to disc 40. The pressure causes the piezo-electric material to generate a small voltage pulse, which passes through capacitor C1 to trigger gate of the SCR and turn it on. Now, the SCR directs the high current power from battery B1 to burn resistor 77 causing it to fail and allowing the potential energy stored in spring 80 to pivot lever 75 about pin 76, thereby withdrawing pin 73 from bore 72. Once pin 73 is removed, the potential energy of negator springs 27a,b will force paddles 60 to pivot down, thereby swinging ends 66 out of holding contact with stops 32, and the store assembly 15a will be ejected through discharge end 16. Once the circuit is broken, the SCR turns off. While fully charged, capacitor C1 precludes any current from passing to the SCR gate to ensure that only one store is ejected.

Finally, while the piezo-electrically actuated launcher has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

What we claim is:

1. A transporting and dispensing device to allow storage, transportation and dispensing of a plurality of stores, comprising:
    a. container means for connection into an aircraft at a breech end and adapted to accept a pneumatic pulse and dispense stores at an oppositely-disposed discharge end;
    b. a plurality of release means for alternatingly closing and opening and thereby allowing individual stores to be ejected from the discharge end;
    c. force means inside said device providing a biasing force onto said stores; and
    d. electronic control means connected to receive a pneumatic pulse and transfer an electric pulse to, and activate, said release means.

2. A device as described in claim 1 wherein said container means comprises a tubular container.

3. A device as described in claim 1 wherein said force means is a pair of negator springs.

4. A device as described in claim 1 wherein aid electronic control means comprises:
    a. a piezo-electric disc;
    b. a capacitor;
    c. an SCR.

5. A device as described in claim 1 wherein said release means comprises at least two paddles pivotally held together at a single location by a pin, said pin connected to failure means.

6. A device as described in claim 5 wherein said failure means is a burn resistor.

7. A transporting and dispensing device comprising:
    a. a tubular launch container, having a breech end for connection into a vehicle, and an oppositely-disposed discharge end;
    b. at least one store slidingly secured inside said container;
    c. biasing means inside said container to force said at least one store out of the discharge end;
    d. a pair of paddles releasingly held adjacent said one store;
    e. spring-loaded means adjacent said paddles to remove a locking pin from said paddles;
    f. piezo-electric means at the breech end to receive pressurized pulses; and
    g. electronic circuitry means, including a capacitor and an SCR, connected to said piezo-electric means and said spring-loaded means to receive an electric pulse and release said spring-loaded means.

* * * * *